(12) United States Patent
Payne

(10) Patent No.: US 6,511,619 B1
(45) Date of Patent: Jan. 28, 2003

(54) MULTIAXIS ROTATIONAL MOLDING APPARATUS AND METHOD

(76) Inventor: LeRoy Payne, 4336 Christensen Rd., Billing, MT (US) 59101

( * ) Notice: Subject to any disclaimer, the term of this patent is extended or adjusted under 35 U.S.C. 154(b) by 0 days.

(21) Appl. No.: 09/446,811

(22) PCT Filed: Apr. 30, 1999

(86) PCT No.: PCT/US99/09382

§ 371 (c)(1),
(2), (4) Date: Dec. 27, 1999

(87) PCT Pub. No.: WO99/56930

PCT Pub. Date: Nov. 11, 1999

Related U.S. Application Data

(60) Continuation-in-part of application No. PCT/US98/08804, filed on May 1, 1998, which is a continuation-in-part of application No. PCT/US96/15498, filed on Sep. 26, 1996, which is a continuation-in-part of application No. PCT/US95/14194, filed on Nov. 3, 1995, which is a continuation-in-part of application No. PCT/US95/06301, filed on May 18, 1995, which is a continuation-in-part of application No. 08/345,564, filed on Nov. 25, 1994, now Pat. No. 5,503,780, which is a continuation-in-part of application No. 08/249,744, filed on May 26, 1994, now Pat. No. 5,507,632, which is a continuation-in-part of application No. 07/950,135, filed on Sep. 24, 1992, now Pat. No. 5,316,701, which is a division of application No. 07/707,656, filed on May 30, 1991, now Pat. No. 5,188,845, which is a continuation-in-part of application No. 07/417,502, filed on Oct. 5, 1989, now Pat. No. 5,022,838, which is a continuation-in-part of application No. 07/271,686, filed on Nov. 16, 1988, now Pat. No. 4,956,133, which is a continuation-in-part of application No. 07/202,267, filed on Jun. 6, 1988, now Pat. No. 4,956,135, which is a continuation-in-part of application No. 06/890,742, filed on Jul. 30, 1986, now Pat. No. 4,749,533, which is a division of application No. 06/766,498, filed on Aug. 19, 1985, now Pat. No. 4,671,753.

(51) Int. Cl.[7] .............................. B28B 1/20; B28B 17/00
(52) U.S. Cl. .................... 264/40.1; 264/40.7; 264/255; 264/310; 425/3; 425/150; 425/169; 425/429
(58) Field of Search ................................ 425/429, 435, 425/150, 169, 3; 264/312, 311, 310, 299, 301, 40.1, 40.7, 255

(56) References Cited

U.S. PATENT DOCUMENTS

| | | | | |
|---|---|---|---|---|
| 3,528,133 | A | * | 9/1970 | Morse |
| 3,843,285 | A | * | 10/1974 | Nitta et al. |
| 3,907,482 | A | * | 9/1975 | Shiota et al. |
| 5,011,636 | A | * | 4/1991 | Payne |
| 5,173,221 | A | * | 12/1992 | Payne |
| 5,188,845 | A | * | 2/1993 | Payne |
| 5,316,701 | A | * | 5/1994 | Payne |
| 5,533,933 | A | * | 7/1996 | Garnjost et al. |
| 5,705,200 | A | * | 1/1998 | Payne |
| 6,175,495 | B1 | * | 1/2001 | Batchelder |

* cited by examiner

Primary Examiner—Jan H. Silbaugh
Assistant Examiner—Geoffrey P. Shipsides
(74) Attorney, Agent, or Firm—Arthur L. Urban

(57) ABSTRACT

A multiaxis rotational molding apparatus includes a support portion, a molding portion and a control portion. The support portion includes an upstanding arcuate frame section. The molding portion includes an upstanding arcuate mold supporting assembly disposed within and spaced from the arcuate frame section. A mold assembly includes separable mold sections forming a substantially enclosed mold cavity carried within the mold supporting assembly. The control portion includes drive assemblies arranged in a preselected configuration adjacent the arcuate frame section selectively energized in coordination with adjacent drive assemblies for movement of the mold supporting assembly in a selected profile. Programmable memory stores preselected operating parameters. Monitors sense operating information form control components. Circuitry transmits signals from the monitors to a coordinator comparing the operating information with operating parameters stored in the memory to control rotation of the mold supporting assembly in a preselected rotational profile.

8 Claims, 1 Drawing Sheet

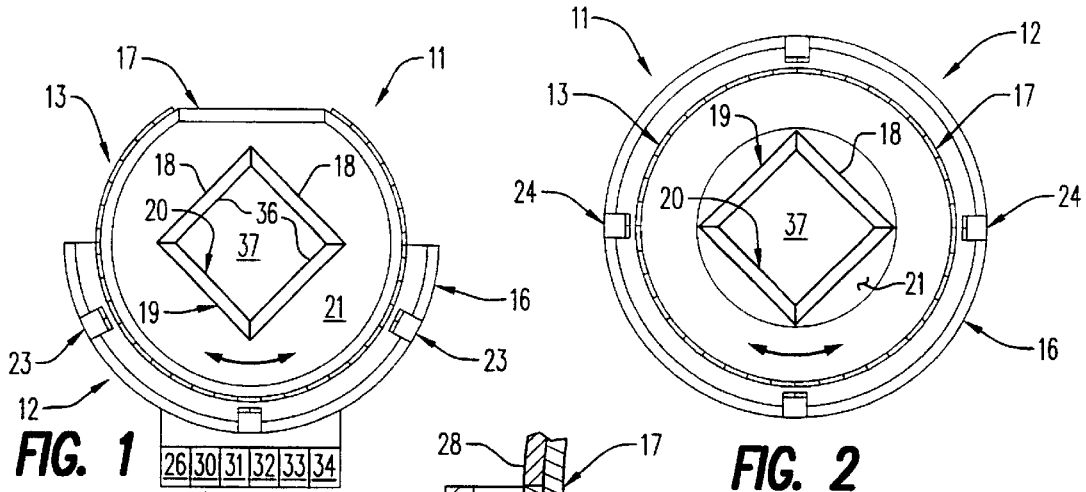
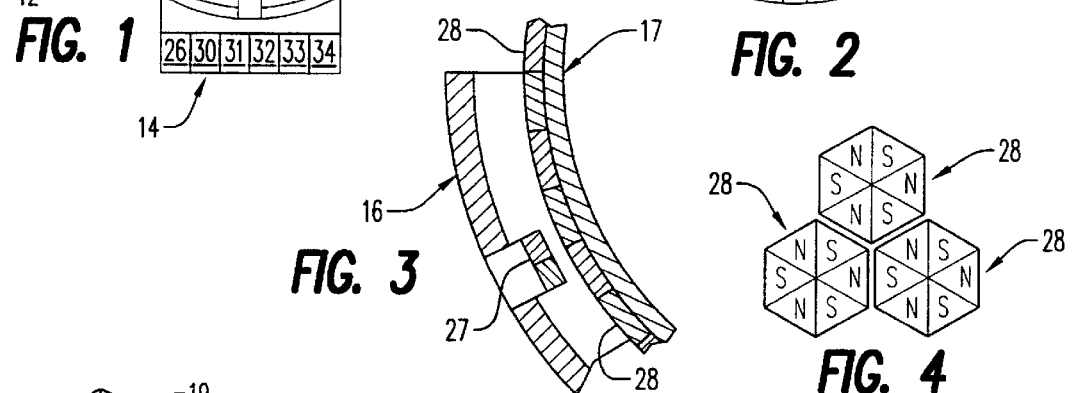
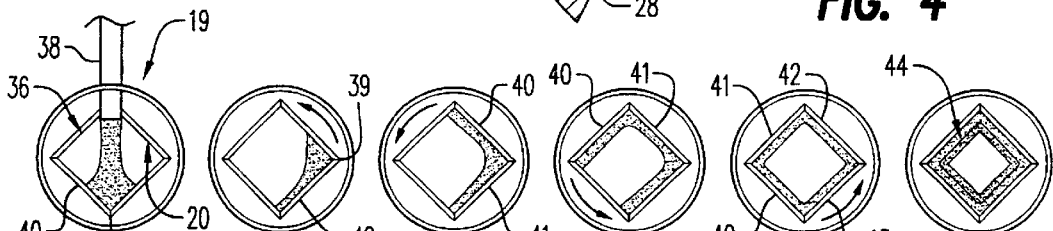
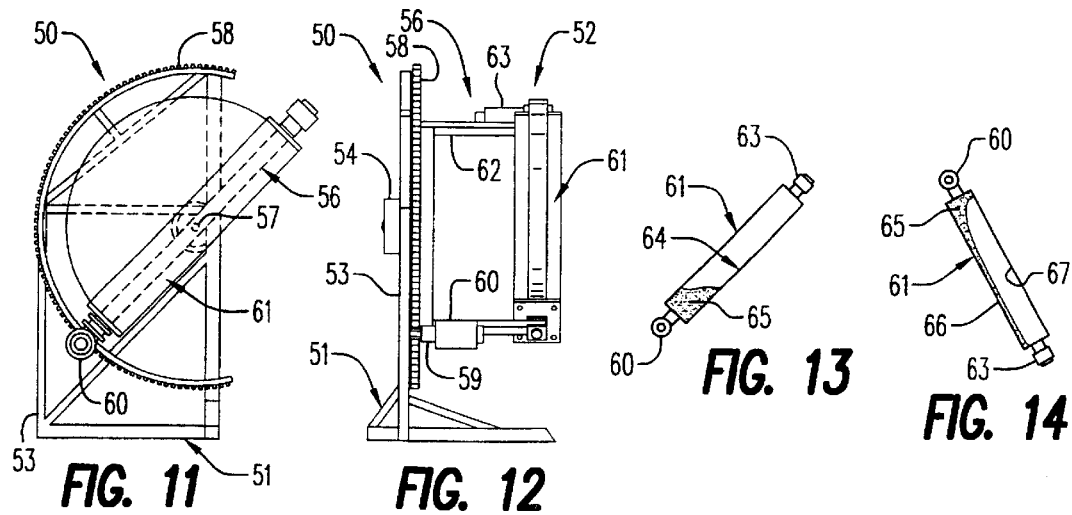

MULTIAXIS ROTATIONAL MOLDING APPARATUS AND METHOD

This application is a continuation-in-part of application No. PCT/US98/08804, filed May 1, 1998, which in turn is a continuation-in-part of application No. PCT/US96/15498, filed Sep. 26, 1996, which in turn is a continuation-in-part of application No. PCT/US95/14194, filed Nov. 3, 1995, which in turn is a continuation-in-part of application No. PCT/US/06301, filed May 18, 1995, which in turn is a continuation-in-part of application Ser. No. 08/345,564, filed Nov. 25, 1994, now U.S. Pat. No. 5,503,780, which in turn is a continuation-in-part of application Ser. No. 08/249,744, filed May 26, 1994, now U.S. Pat. No. 5,507,632, which in turn is a continuation-in-part of application Ser. No. 07/950,135, filed Sep. 24, 1992, now U.S. Pat. No. 5,316,701, which in turn is a division of application Ser. No. 07/707,656, filed May 30, 1991, now U.S. Pat. No. 5,188,845, which in turn is a continuation-in-part of application Ser. No. 07/417,502, filed Oct. 5, 1989, now U.S. Pat. No. 5,022,838, which in turn is a continuation in-part of application Ser. No. 07/271,686, filed Nov. 16, 1988, now U.S. Pat. No. 4,956,133, which in turn is a continuation-in-part of application Ser. No 07/202,267, filed Jun. 6, 1988, now U.S. Pat. No. 4,956,135, which in turn is a continuation-in-part of application Ser. No. 06/890,742, filed Jul. 30, 1986, now U.S. Pat. No. 4,749,533, which in turn is a division of application Ser. No. 06/766,498, filed Aug. 19, 1985, now U.S. Pat. No. 4,671,753.

This invention relates to a novel molding apparatus and method and more particularly relates to a new multiaxis rotational molding apparatus and method.

The production of man-made plastic and resin articles is an industry that utilizes a high degree of automatically controlled continuous processing. However, for units of appreciable size, batch processing still is the rule rather than the exception. For example, in the production of fiberglass structures such as boats, it is customary to construct the hulls by hand. A plurality of resin and fiberglass layers are sequentially laminated on an open mold or a plurality of mixed resin/chopped fiber coatings are applied over the mold.

Such hand building procedures require a great amount of labor, supervision and continuous inspection to insure that a reasonable level of quality is achieved. This greatly increases the cost of the product.

The applicant's earlier patents listed above provide a novel method and apparatus for producing both large and small molded structures continuously. The apparatus includes unique combinations of components to produce a wide variety of different products. Achieving this capability requires a major capital investment. Also, personnel to utilize the broad parameters of the apparatus normally are highly trained and experienced.

The present invention provides a novel molding apparatus and method which not only overcome the deficiencies of present technology but also provide features and advantages not found in earlier expedients. The multiaxis rotational molding apparatus and method of the invention provide a means for the production of a large number of uniform high quality products rapidly and efficiently with a minimum capital investment and a significant energy savings.

The multiaxis rotational molding apparatus of the present invention is simple in design and can be produced relatively inexpensively. Commercially available materials and components can be utilized in the manufacture of the apparatus. Conventional metal fabricating procedures can be employed by semi-skilled labor in the manufacture of the apparatus. The apparatus is durable in construction and has a long useful life with a minimum of maintenance.

The apparatus of the invention can be operated by individuals with limited mechanical skills and experience. A large number of high quality molded structures can be produced rapidly by such persons safely and efficiently with a minimum of supervision.

The molding apparatus and method of the invention can be modified to mold a wide variety of new structures. Variations both in product configuration and composition can be attained simply and conveniently with the apparatus and method of the invention. Even with such variations, uniformity and quality of product dimensions and shapes still are maintained without difficulty.

Benefits and advantages of the novel multiaxis rotatable molding apparatus and method of the present invention will be apparent from the following description and the accompanying drawings in which:

FIG. 1 is a side view of one form of multiaxis rotational molding apparatus of the invention;

FIG. 2 is a top view of the molding apparatus shown in FIG. 1;

FIG. 3 is an enlarged fragmentary side view of the molding apparatus shown in FIGS. 1 and 2;

FIG. 4 is a further enlarged fragmentary view of the surface of the mold supporting assembly of the molding apparatus of the invention shown in FIGS. 1–3;

FIGS. 5–10 are schematic illustrations of the molding apparatus shown in FIGS. 1–4 during steps of the molding method of the present invention;

FIG. 11 is a side view of a further form of the multiaxis rotational molding apparatus of the present invention;

FIG. 12 is a left end view of the molding apparatus shown in FIG. 11; and

FIGS. 13 and 14 are schematic illustrations of the molding apparatus shown in FIGS. 11, 12 during steps of the molding method of the present invention.

As shown in FIGS. 1–4 of the drawings, one form of multiaxis rotational molding apparatus 11 of the present invention includes a support portion 12, a molding portion 13 and a control portion 14. The support portion 12 of the molding apparatus 11 includes an upstanding arcuate frame section 16.

The molding portion 13 of the multiaxis rotational molding apparatus 11 of the present invention includes an upstanding arcuate mold supporting assembly 17. The mold supporting assembly 17 is disposed within the arcuate frame section 16 and spaced therefrom. The molding portion 13 also includes a plurality of separable mold sections 18 carried within the arcuate mold supporting assembly 17. The assembled mold sections form a mold assembly 19 with a mold cavity 20. Connector means 21 selectively secures the mold sections 18 together and to the mold supporting assembly 17.

As shown in the drawings, the arcuate frame section 16 and the mold supporting assembly 17 of the molding apparatus 11 advantageously are axially aligned. Preferably, the arcuate frame section and the mold supporting assembly include substantially spherical configurations. Advantageously, a fluid material is disposed between the arcuate frame section and the mold supporting assembly. The fluid material preferably is confined between the frame section 16 and the mold supporting assembly 17 with a sealing barrier therebetween. Lifting means may be provided for raising or lowering the position of the mold supporting assembly with respect to the frame section.

The control portion 14 of the multiaxis rotational molding apparatus 11 of the present invention includes a plurality of drive assemblies 23,24 arranged in a preselected configuration adjacent the arcuate frame section 16. Activating means 26 selectively energize each drive assembly in coordination with adjacent drive assemblies to provide movement of the mold supporting assembly 17 in a preselected profile.

Preferably, the drive assemblies 23,24 include a plurality of electromagnetic elements 27,28 as shown in the drawings. The electromagnetic elements are disposed within or closely adjacent to the arcuate frame section 16 and the arcuate mold supporting assembly 17. Each electromagnetic element is energized with a preselected charge in a preselected sequence program. The program is preselected to attract or repel an electromagnetic element in its path as the mold supporting assembly 17 is moved with respect to frame section 16. Such attraction or repulsion when coordinated with the energization of adjacent electromagnetic element produces a controlled movement therebetween and results in a desired preselected movement of the mold supporting assembly with respect to the frame section 16.

Other drive assemblies may include gear motors, chains and sprockets connected thereto. The activating means may actuate other components such as pumps, valves, etc.

One drive assembly 23 rotates the mold supporting assembly 17 and the assembled mold sections 18 connected thereto in a generally vertical plane. Another drive assembly 24 rotates the mold supporting assembly and the assembled mold sections affixed thereto along a vertical axis generally perpendicular to the axis of rotation achieved with drive assembly 23.

The control portion 14 also includes programmable memory means 30, coordinating means 31, monitoring means 32 and circuitry therefor. The coordinating means 31 advantageously includes a process controller 33 that initiates changes in the flows of materials and speeds of drives for the mold assembly to bring variations therein back to the respective rates specified in the programs present in the memory 30. This coordination commonly is achieved through the transmission of information such as digital pulses from the monitors 32 and/or sensors 34 at the control components to the process controller 33.

The operating information is compared with the preselected programming parameters stored in the memory 30. If differences are detected, instructions from the controller change the operation of the components to restore the various operations to the preselected processing specifications.

In the use of the multiaxis rotational molding apparatus 11 of the present invention, the designs of the structures desired first are established. Then, each design is programmed into the memory 30.

To start the operation of the apparatus 11, buttons and/or switches of a control panel (not shown) are depressed to activate the memory 30 and the other components of the control portion 14. The coordinating means 31 energizes drive assemblies 23,24. Also, monitors 32 and pumps, valves, etc. (not shown) are energized by the coordinating means 31 in the preselected sequences of the program stored in the memory 30. This causes the raw materials in reservoirs (not shown) to advance along inlet conduits toward the mold cavity 20 formed with assembled mold sections 18. For example, to mold a structure including a polyurethane resin, one reservoir may contain a liquid reactive resin forming material, a second reservoir a particulate solid recyclable material and a third or more reservoirs—colors, catalysts, etc. as required.

To produce high quality molded structures of the invention, it is important that the raw material be uniform in volume and composition. This can be facilitated by providing a continuous flow of raw materials and/or polymerizable mixtures thereof onto an internal surface 36 of mold cavity 20. However, the volume of the mixture delivered will vary depending upon the particular incremental area being covered at any instant. Also, the delivery to a particular mold assembly 19 will be terminated completely when a molded structure 37 is being removed therefrom.

Advantageously, a separate bypass conduit (not shown) is utilized from the end of each inlet conduit at a point adjacent a particular mold assembly back to the respective reservoir. This construction provides for the delivery of uniform raw materials and/or freshly formed polymerizable mixtures thereof even though the distance is considerable between the reservoirs and the mold assemblies. The control portion 14 coordinates the operation of the various system components so the required formulation flows onto the desired areas of the mold cavity.

Rotation of the mold assembly 19 about two substantially perpendicular axes is started and continued in accordance with a preselected program while the raw materials and/or freshly formed polymerizable mixtures are transferred into the cavity 20 of the mold assembly 19. The multiple axis movement of the mold assembly is continued to complete the flow of the mixture over all areas being covered within the mold cavity. All movements are controlled within the parameters stored in the memory 30.

For particular structures, the movements about the respective axes may be continuous and/or intermittent at changing rates. Also, it is desirable. to provide arcuate rotation, that is, movement about an arc such as a rocking motion. Monitors 32 located within the mold assembly 19 signal the process controller 33 when the polymerizable mixture has been distributed over the preselected areas of the mold cavity so the controller can initiate the next step of the molding method.

With the control components of the molding apparatus 11 activated, a dispenser 38 is aligned with the mold assembly 19 as schematically illustrated in FIG. 5 and a freshly formed polymerizable mixture is introduced into mold cavity 20 and flows downwardly forming a pool of liquid 39 at the bottom of the cavity. Thereafter, as the mold assembly 19 is rotated in a counter-clockwise direction to a position shown in FIG. 6, the pool of liquid 39 no longer is in the lowest part of the mold assembly. Stopping the rotation in this position, allows the liquid to flow downwardly by gravity coating a portion 40 of the surface 36 of the cavity.

If insufficient liquid remains after the first portion 40 is coated, additional liquid can be added before the next rotation. Another portion 41 of the cavity surface may be coated by rotating the mold cavity in the same direction approximately 90 degrees and stopping it again. Excess liquid moved up the cavity will flow back downwardly by gravity forming a coating on an adjacent area 41 of the the surface (FIG. 7).

Remaining areas of the surface may be coated utilizing gravitational forces by positioning uncoated areas toward the bottom of the mold assembly and delivering additional quantities of the polymerizable liquid periodically to form a pool thereof in the bottom of the cavity and rotating the mold assembly 19 to move the liquid away from the bottom, stopping rotation and allowing the liquid to flow downwardly forming a coating on areas 42,43 of the mold cavity surface 36 in a preselected sequence as shown in FIGS. 8 and 9. The flowing of the polymerizable liquid over the cavity surfaces and the movement of the mold assembly in a preselected program resulting in the formation of an integrally molded resin structure therefrom all are monitored during the molding operation.

In molding structures with more complex configurations, it may be advantageous to change the direction of rotation to achieve complete coating of the mold cavity. In any case, a uniform coating of the mold cavity may be achieved using the novel multiaxis rotational molding apparatus of the invention. The apparatus which can be fabricated with a minimum capital investment utilizes a simple control program that consumes less energy.

When all of the mold surfaces have been coated and the coatings have set to achieve structural integrity, the structure being molded is complete. The mold assembly comes to rest and is cooled. The resulting integrally molded structure is freed from the mold assembly by separating the mold sections so that the molding operation can be repeated.

To form multilayer structures, the steps described above may be repeated. Before the mold assembly is opened, a second freshly formed polymerizable mixture is introduced into the resin coated mold cavity and the steps repeated with a second polymerizable mixture (FIG. 10). The multiple coatings 44 formed on the cavity surfaces are set in place forming a multilayer structure. With the appropriate selection of the formulation of the mixtures, the resulting molded structure, for example, may provide an integrally laminated two layer structure with a durable outer surface and a chemical resistant lining.

Continuous production of such structures can be achieved by aligning the first polymerizable mixture with an adjacent second mold assembly (not shown) and flowing that polymerizable mixture into the second mold cavity thereof. Simultaneously therewith, a second polymerizable mixture may be aligned with the first mold assembly 19 and the mixture delivered into the mold cavity of the first mold assembly flowing over the first resin formed in the cavity. The flowing of the first and second mixtures within the first and second mold cavities, the setting of the coatings and the formation of a first and second resin therefrom are monitored.

In the same way, if desired, the first, second and any other polymerizable mixtures can be flowed into each mold cavity of any additional mold assemblies until all of the mold assemblies have received the mixtures according to the preselected molding parameters. The monitoring of the mixture flow, the formation of resins therefrom and mold assembly rotation are continued throughout the molding operation as well as the coordinating of this operating information with the preselected program profile.

When a molded structure within a mold cavity is sufficiently cured that it possesses structural integrity, rotation of the respective mold assembly is stopped and the mold sections 18 are separated e.g. by cooling to free the structural unit. Advantageously, the mold assembly may be transferred to an adjacent mold receiving station (not shown) to separate the cured structure. The molded structure then may be set aside to complete the curing of the resin therein. During this period, the molded structure, free of the mold's restraint, stresses the high density outer skin or layer. This stressing of the skin increases the strength and puncture resistance thereof and also the structural strength of the unit itself.

The mold sections 18 are prepared for another molding cycle. This may include changing the position of one or more mold sections with respect to each other, the substitution of mold sections with different configurations and the like. Also, cavity changing inserts may be employed, if desired. The mold sections 18 then are assembled together and the mold assembly now is ready for the next molding cycle.

FIGS. 11 and 12 illustrate another form of rotational molding apparatus 50 of the present invention. The apparatus provides for the molding of large structures on cantilever multiaxis molding apparatus without major reconstruction thereof. The rotational molding apparatus 50 as shown in the drawings includes a support portion 51 and a molding portion 52. The support portion includes a vertical frame section 53 with a horizontally oriented arm member 54 extending therefrom. A U-shaped mold supporting assembly 56 is rotatably mounted on arm member 54 through a shaft 57.

A vertically disposed arcuate guide member 58 is mounted on frame section 53 in the path of one leg 59 of U-shaped mold supporting assembly 56. Drive means shown as motor 60 operatively connects the mold supporting assembly 56 with guide member 58 and advances therealong to rotate the supporting assembly about shaft 57 as an axis. A mold assembly 61 is rotatably supported between the legs 59,62 of the supporting assembly 56. The mold assembly is rotated about an axis perpendicular to shaft 57 by drive means 63 mounted on leg 62.

Structures may be formed with the molding apparatus 50 of the invention continuously and automatically employing the control portion 14 of molding apparatus 11 described above. In this way, the programmed memory can distribute a polymerizable liquid over a mold cavity 64 of mold assembly 61 by delivering a polymerizable liquid into the bottom of the mold cavity (FIG. 13). Thereafter, as the mold assembly is rotated to a position as shown in FIG. 14, the pool of liquid 65 no longer is in the lowest part of the mold cavity. Stopping the rotation in this position allows the liquid to flow downwardly by gravity coating a portion 66 of the surface 67 of the cavity.

Remaining portions of the cavity surface 67 may be coated utilizing gravitational forces by delivering a pool of polymerizable liquid into the bottom of the cavity and positioning uncoated surface areas with respect to the pool of liquid. Rotation of the mold assembly with periodic stops coordinated with delivery of the liquid in a preselected sequence program will produce a uniform coating of the mold cavity to fabricate a preselected molded structure.

The polymerizable mixtures employed to produce the structures of the invention are selected to be capable of reaction to form the particular resin desired in the final structure. Advantageously, the resin is a thermosetting resin such as a polyurethane or polyester. Should a polyurethane be desired, one component may be an isocyanate and another may be a polyol. More commonly, different partially formed materials which upon mixing interact to form the desired polyurethane may be employed. Examples of such partially formed materials include so-called "A stage" resins and "B stage" resins.

Other resin forming systems may utilize a resin forming material and a catalyst. Additional components can be pre-mixed with one of the resin formers, e.g. fillers, reinforcements, colors and the like.

The particulate solid additive material may be any of a wide variety of materials which impart special properties to the final structure such as wear resistance, lubricity, electrical, magnetic, temperature conductivity or isolation, and the like. Some inexpensive particulate materials generally are readily available at a particular job site. Natural mineral particulate material such as sand and gravel normally is present or can be produced simply by crushing rock at the site.

Waste or recycled materials which can be shredded or ground into particles of suitable size can be utilized. Particularly useful are particles formed by shredding or grinding discarded tires and similar products. Since the particles are encapsulated with the resin forming material and not saturated therewith, many different waste materials may be employed.

The above description and the accompanying drawings show that the present invention provides a novel multiaxis rotational molding apparatus and method which not only overcome the deficiencies and shortcomings of earlier expedients, but in addition provide novel features and advantages not found previously. The apparatus and method of the invention provide simple inexpensive means for producing uniform high quality products efficiently and at high rates of production while minimizing capital investment and achieving significant energy savings. Structures can be produced automatically with the apparatus of the invention by operators with limited experience and aptitude after a short period of instruction.

It will be apparent that various modifications can be made in the multiaxis rotational molding apparatus and method described in detail above and shown in the drawings within the scope of the present invention. The size, configuration and arrangement of components such as the mold assembly can be changed to meet specific requirements. In addition, the number and sequence of processing steps may be different. These and other changes can be made in the apparatus and method described provided the functioning and operation thereof are not adversely affected. Therefore, the scope of the present invention is to be limited only by the following claims.

What is claimed is:

1. Multiaxis rotational molding apparatus including a support portion, a molding portion and a control portion; said support portion including an upstanding arcuate frame section; said molding portion including an upstanding arcuate mold supporting assembly disposed within said arcuate frame section and spaced therefrom, said arcuate frame section and said arcuate mold assembly being of substantially spherical configuration, a fluid material disposed therebetween, a mold assembly including a plurality of separable mold sections forming a substantially enclosed mold cavity carried within said mold supporting assembly, connecting means selectively securing said mold sections together and to said mold supporting assembly; said control portion including a plurality of drive assemblies including a plurality of spaced electromagnetic elements arranged in a preselected configuration adjacent said arcuate frame section and said mold supporting assembly, activating means selectively energizing each electromagnetic element of said drive assemblies in coordination with adjacent electromagnetic elements to provide rotation and movement of said mold supporting assembly in a preselected profile, programmable memory means storing preselected operating parameters, monitoring means sensing operating information from control components, circuitry transmitting signals from said monitoring means to coordinating means comparing said operating information with operating parameters stored in said memory means and activating said actuating means to control rotation of said mold supporting assembly in a preselected rotational profile to form molded structures with said molding apparatus continuously in a preselected multiaxis molding profile.

2. Multiaxis rotational molding apparatus according to claim 1 wherein said said arcuate frame section and said mold supporting assembly are axially aligned.

3. Multiaxis rotational molding apparatus according to claim 1 wherein said fluid material is confined between said arcuate frame section and said mold supporting assembly with a sealing barrier extending therebetween.

4. Multiaxis rotational molding apparatus according to claim 1 including lifting means raising and lowering the position of said mold supporting assembly with respect to said arcuate frame section.

5. A method of forming an integrally molded structure in a multiaxis rotational molding operation including the steps of supplying a preselected quantity of a polymerizable liquid to a multisection mold assembly, forming a pool of said polymerizable liquid in a lower part of an internal mold cavity of said mold assembly, selectively energizing a plurality of electromagnetic elements disposed adjacent said mold assembly in a preselected profile to rotate said mold assembly and move said polymerizable liquid to a position within said mold cavity above its original position therein, de-energizing said electromagnetic elements to stop the rotation of said mold assembly, allowing said polymerizable liquid to flow over a preselected area of an internal surface of said mold cavity while said mold assembly is at rest, monitoring said flowing of said polymerizable liquid over said mold cavity surface and formation of a resin therefrom, periodically supplying additional preselected quantities of said polymerizable liquid to said mold assembly, energizing and de-energizing said electromagnetic elements to rotate said mold assembly in a preselected arc, allowing said polymerizable liquid to flow over a preselected second area of said internal surface of said mold cavity while said mold assembly is at rest, and repeating said steps until said internal cavity surface is completely coated with said polymerizable liquid while monitoring each flowing of said polymerizable liquid over said mold cavity surface and formation of resins therefrom, monitoring individually each axis rotation of said mold assembly, and coordinating said monitored flowing of each polymerizable liquid, and said monitored formation of each resin with each monitored axis rotation in a preselected profile to form said integrally molded structure, and separating said mold sections of said mold assembly after said integrally molded structure therein has achieved structural integrity within said mold cavity.

6. A method of continuously forming integrally molded structures according to claim 5 including the steps of transferring said mold assembly to an adjacent mold receiving station prior to separating said mold sections and removing said structure from said separated mold sections and thereafter returning said mold assembly to a molding position for repeating the above steps.

7. A method of continuously forming integrally molded structures according to the method of claim 5 including the step of providing a plurality of mold assemblies for each molding position so that molding can be continued while other mold assemblies are being opened and prepared for repeating the above steps.

8. A method of continuously forming integrally molded structures according to the method of claim 5 including the step of introducing solid particles into said first mold cavity and distributing said particles into a preselected configuration before supplying said first polymerizable mixture to said first mold assembly.

* * * * *